(12) United States Patent
Bay et al.

(10) Patent No.: US 11,704,760 B2
(45) Date of Patent: Jul. 18, 2023

(54) SYSTEM AND METHOD FOR DETERMINING OPTIMAL PATHWAYS TO A PREDETERMINED GOAL BASED ON DATABASE ANALYSIS

(71) Applicant: eScholar LLC., White Plains, NY (US)

(72) Inventors: Gabriel Bay, Fairfield, CT (US); Shawn Bay, Fairfield, CT (US); Stephen Eschenbach, Millburn, NJ (US); Robert Gooby, Gainesville, GA (US); Samantha Nielsen, Darien, CT (US)

(73) Assignee: CREDREADY, INC., Armonk, NY (US)

( * ) Notice: Subject to any disclaimer, the term of this patent is extended or adjusted under 35 U.S.C. 154(b) by 81 days.

(21) Appl. No.: 16/154,327

(22) Filed: Oct. 8, 2018

(65) Prior Publication Data
US 2019/0114730 A1    Apr. 18, 2019

Related U.S. Application Data

(60) Provisional application No. 62/707,012, filed on Oct. 16, 2017.

(51) Int. Cl.
*G06Q 50/20* (2012.01)
*G06Q 10/0631* (2023.01)

(52) U.S. Cl.
CPC . *G06Q 50/2053* (2013.01); *G06Q 10/063116* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0220811 A1* | 11/2003 | Fan | .................... | G06Q 50/2057 705/328 |
| 2010/0094886 A1* | 4/2010 | Krebs | ...................... | G09B 7/00 707/758 |
| 2013/0290005 A1* | 10/2013 | Vesto | .................... | G06Q 10/06 705/2 |
| 2015/0242979 A1* | 8/2015 | Abts | ....................... | G09B 5/00 705/328 |

(Continued)

OTHER PUBLICATIONS

K. Wongsuphasawat and B. Shneiderman, "Finding comparable temporal categorical records: A similarity measure with an interactive visualization," 2009 IEEE Symposium on Visual Analytics Science and Technology, Atlantic City, NJ, USA, 2009, pp. 27-34, doi: 10.1109/VAST.2009.5332595 (Year: 2009).*

*Primary Examiner* — Gabrielle A McCormick
*Assistant Examiner* — Maame Ofori-Awuah
(74) *Attorney, Agent, or Firm* — M&B IP Analysts, LLC

(57) ABSTRACT

A system and method for determining optimal pathways to a predetermined goal, including generating a unique code for an event within a plurality of data records, where the same unique code will be generated for similar events; constructing at least one pathway using the unique codes based on the events, wherein the at least one pathway includes at least one segment; determining a goal, wherein the goal is the end of the at least one pathway; comparing the at least one pathway to other pathways sharing the determined goal; and optimizing the pathway for achievement of the determined goal.

20 Claims, 4 Drawing Sheets

(56) References Cited

U.S. PATENT DOCUMENTS

2016/0026706 A1* 1/2016 Lum ............... G06F 16/955
　　　　　　　　　　　　　　　　707/740
2016/0140679 A1* 5/2016 Segal .............. G06Q 50/2053
　　　　　　　　　　　　　　　　705/327
2016/0320946 A1* 11/2016 Zhao ............... G06F 16/9535

* cited by examiner

P<000661>PPPPPPPPP  — 210

P<000661><000512>PPPPPPPPP  — 220

FIG. 2

P<000661><000512>P<314159><271828>P<183330>PPPPPPPP  — 310

P<000661><000512>P<314159><271828>PP<183330>PPPPPPP

SYSTEM AND METHOD FOR DETERMINING OPTIMAL PATHWAYS TO A PREDETERMINED GOAL BASED ON DATABASE ANALYSIS

CROSS-REFERENCE TO RELATED APPLICATIONS

This application claims the benefit of U.S. Provisional Application No. 62/707,012 filed on Oct. 16, 2017, the contents of which are hereby incorporated by reference.

TECHNICAL FIELD

The present disclosure relates generally to database analysis, and more specifically, to determining one or more pathways to a predetermined goal based on database analysis.

BACKGROUND

Achieving a specific goal in the most optimal manner is a desirable objective in any discipline or field. Many individuals wish to determine the most effective path to achieving a desired target, whether that include a degree within the academic context, a promotion within a professional context, a statistical accomplishment within a sporting context, mastery of a hobby or skill, and similar pursuits.

While comparing a single individual to a handful of individuals who have previously been at a similar stage can be helpful, e.g., comparing a second year student with specific coursework completed to another student who had been at the same stage previously and successfully graduated with the desired degree, such comparisons offer only limited information, as one or two similar students can only provide limited knowledge of how successful a certain path can be when compared to alternative paths.

Leveraging large data sets to determine optimal paths for various goals based on previously documented paths is a desirable alternative. However, such a comparison, when done using a direct path to path comparison, requires much computational power and time, and remains limited in comparing single paths to each other.

To achieve a complete analysis, queries of each instance of goal achievement and then queries for each step leading to such goal achievement much be executed. This series of queries would require different search predicates for each goal achievement timeframe. Even after this is done, comparisons of similar pathways would require additional complex search predicates for each relevant timeframe. Thus, such methods require significant time and cost inputs, as well as remaining limited in the data output.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for determining optimal pathways to a predetermined goal, the method including generating a unique code for an event within a plurality of data records, where the same unique code will be generated for similar events; constructing at least one pathway using the unique codes based on the events, wherein the at least one unique pathway includes at least one segment; determining a goal, wherein the goal is the end of the at least one pathway; comparing the at least one pathway to other pathways sharing the determined goal; and optimizing the pathway for achievement of the determined goal.

Certain embodiments disclosed herein also include a non-transitory computer readable medium having stored thereon instructions for causing a processing circuitry to perform a process, the process including: generating a unique code for an event within a plurality of data records, where the same unique code will be generated for similar events; constructing at least one pathway using the unique codes based on the events, wherein the at least one unique pathway includes at least one segment; determining a goal, wherein the goal is the end of the at least one pathway; comparing the at least one pathway to other pathways sharing the determined goal; and optimizing the pathway for achievement of the determined goal.

Certain embodiments disclosed herein also include system for determining optimal pathways to a predetermined goal, including: a processing circuitry; and a memory, the memory containing instructions that, when executed by the processing circuitry, configure the system to: generate a unique code for an event within a plurality of data records, where the same unique code will be generated for similar events; construct at least one pathway using the unique codes based on the events, wherein the at least one unique pathway comprises at least one segment; determine a goal, wherein the goal is the end of the at least one pathway; compare the at least one pathway to other pathways sharing the determined goal; and optimize the pathway for achievement of the determined goal.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 shows two example pathways generated according to an embodiment.

FIG. 3 shows two example distinct pathways according to an embodiment.

DETAILED DESCRIPTION

Figure 1:
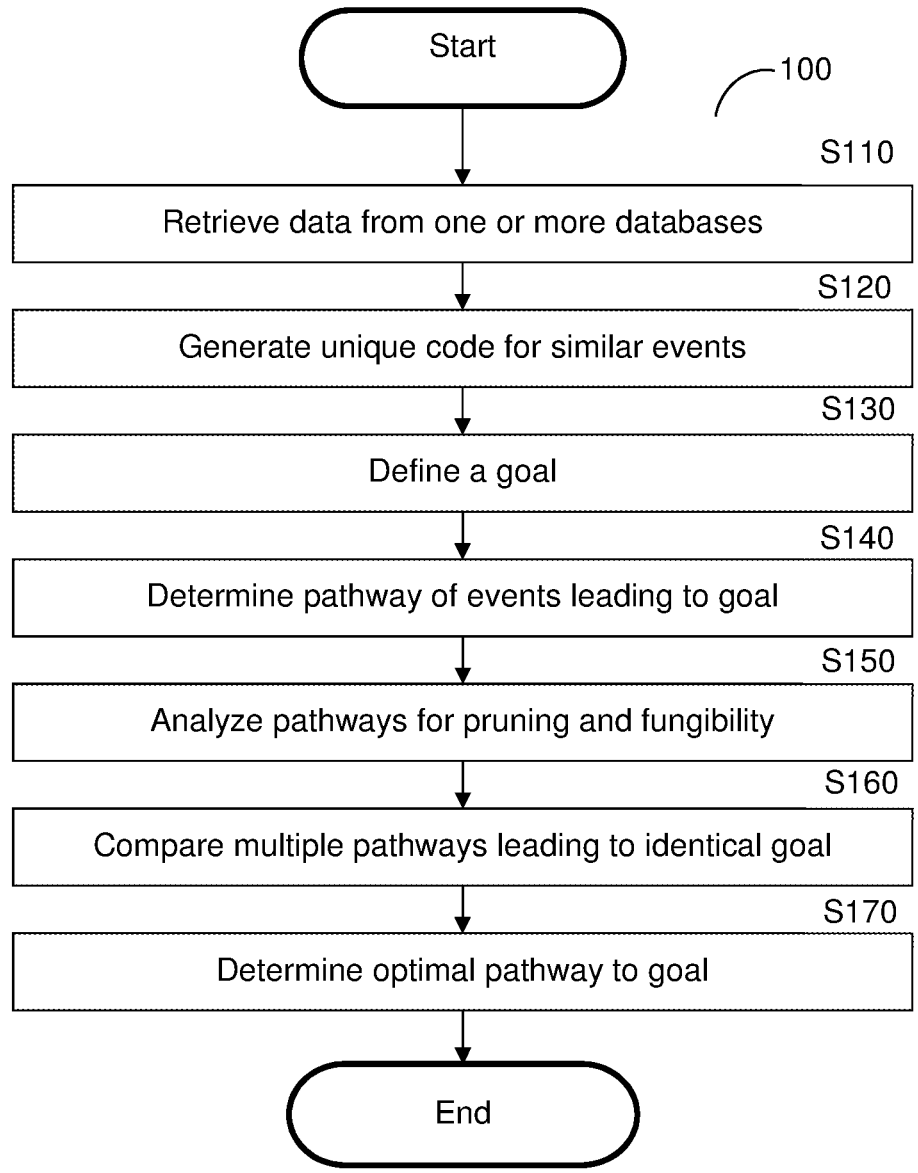
FIG. 1 is a flowchart of a method of determining an optimal pathway to a goal, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for determining optimal pathways to a predetermined goal based on database analysis. The present disclosure includes collecting data from one or more databases and generating a unique code for identical or similar data components which occur in the same time period order, contained in individual records or groups of records. The data includes various events or events that form a pathway to a goal or outcome. Various pathways may lead to the same goal, and these various pathways are analyzed to determine the optimal pathway for reaching that goal, including minimizing cost and time and maximizing a likelihood of success.

FIG. 1 is a flowchart 100 of a method of determining an optimal pathway to a goal, according to an embodiment.

At S110, data from one or more databases is retrieved. The data may include records of a collection of events that have occurred over a specified period of time, and may represent various events associated with multiple individuals. The various events may be associated with a particular context, such as coursework completed with the goal of achieving an educational degree, experiences associated with advancement of a professional goal, steps required to master a skill, treatment steps for a medical patient, and the like. Within the educational context, for example, each of the various events may include coursework completed, grades achieved, length of time used to complete each event, and the like.

In one embodiment, the relationship between various events is determined as well. Such relationships include a temporal relationship, namely the sequence in which the various events have happened, as well as other relationships such as pre-requisite requirements for related courses.

The database may include a collection of a large number of records associated with a particular event. Continuing with the aforementioned educational example, a database may include the database of all students enrolled in a particular educational institution, such as a college or a university. The method discussed herein may include accessing databases of multiple institutions, e.g., multiple colleges, and thus retrieving records, for example, of many students across a wide variety of educational institutions. It should be noted that a database may include any data source residing in a non-transitory repository, additional examples for a data source may include a data lake, a data warehouse, a cloud computing storage platform, and the like.

At S120, a unique code is generated for each unique event within the one or more databases. In an embodiment, an event may be determined to be unique based on predetermined guidelines. For example, a course in College A may be listed within Database A as "Calculus III," and is assigned a unique code, while the same course in College B may listed within Database B as "Multivariable Calculus." If these two courses are determined to be equal for the purposes of the present disclosure, each course may be assigned the same unique code. This code, shared by these two courses and any other courses determined to be equal for the purposes of the present disclosure, will be different from the unique codes of all other courses in all accessible databases where the courses are in fact different.

In an embodiment, determining if two experiences or events are equal includes a two-part test. First, each experience is required to have the equivalent effect on the success on the pathway in achieving the goal. If this is true, then the two experiences are deemed to be equivalent. For example, in the aforementioned case of "Multivariable Calculus" and "Calculus III" being determined to be equal, first their relative contributions to the success of the pathway must be measured and found to be equivalent. If this is the case, then their relatedness is determined, e.g., here determined by the fact that they both belong to the same field of mathematics, namely, calculus.

At S130, at least one goal is defined. A goal is any desired outcome that is the result of one or more events. As non-limiting examples, a goal may be the achievement of an educational degree, the promotion to a professional level, the mastery of a specific skill, the successful treatment of a patient, and the like. In an embodiment, a goal is defined based on a user input. In a further embodiment, a goal may be predefined and stored within the one or more databases. For example, within the educational context, each educational institution may have a list of degrees offered, where each degree is defined as a potential goal.

At S140, a pathway to at least one goal is determined. A pathway is a collection of events that lead from a starting point to the defined goal, and may be divided into one or more segments containing one or more events. In an embodiment, the segments are representative of defined units of time based on when the events contained therein occur. For example, within an educational context, a pathway may be divided into segments that are representative of various semesters, such as a fall semester, winter semester, spring semester, and summer semester. Alternatively, each academic year may be assigned as a single segment. In a professional or skill improvement context, the segments may include months, weeks, or days. Shorter term goals, e.g., a student meeting a goal defined by an Individual Education Plan (IEP), or a patient undergoing a certain course of treatment, could have periods of months, weeks or days. This flexibility supports the ability to efficiently tailor a measure of time relative to the goal.

In an embodiment, the pathway is represented by a string of alphanumeric characters. The string may be represented by a concatenation of period delimiters, key delimiters, and groups of key builds, representing the pathway defined by the data in the records. The completed concatenation is referred to as a navigation code representing a particular pathway.

The string may be an ordered string of keys associated with each record and associated data, in sequence. The string may be divided into segments, with each segment representing an event recorded in the record's data that happened in a single period (e.g., day, week, month, year, etc.). Since multiple events can happen within a single period, the keys are sorted in the same order (i.e., ascending or descending) within each defined period segment. Using this system, even events that were recorded at different times, but are associated with the same period, would produce the exact same code segment regardless of their order in the database or the specific time stamp of the event. For example, if the period of a segment is divided into a scholastic semester, it would not matter if a first pathway contained Course 1 occurring on a daily basis before Course 2, and a second pathway contained Course 2 occurring on a daily basis before Course 1, so long as both Course 1 and Course 2 occur within the semester period. Thus, with respect to these courses, the first pathway would appear identical to the second pathway.

Accordingly, different record groups containing identical events happening in the same order, within the defined period subdivisions, are deemed to have the same pathway or pathway segment.

The navigation code serves not only as an identifier code for a particular pathway, but it can also be a shorthand method of representing the structure and composition of that pathway, as described in more detail below in regard to FIGS. 2 and 3. Thus, pathways that share the same navigation code can be aggregated into one common pathway. Events that happen close to one another, namely within a predetermined timeframe, generate navigation keys with the same time period designation, and are formed into a single sequence.

At optional S150, an identified pathway is pruned, where pruning indicates the removal of any events determined to be non-essential to the success of the pathway. For example, certain extra-curricular activities may be present within a student pathway, but may be determined to not have a significant effect on the success on the pathway in achieving the goal. In a further embodiment, a pathway is analyzed to determine the fungibility of events contained therein. Fungibility is the interchangeable characteristic of an event, such that it may be swapped with another event without affecting the pathway.

At S160, the determined pathway is compared to other pathways with similar goals. These other pathways may be accessed from a database. Sequences of the navigation code for one pathway may be used to search for equal or similar sequences in other pathways. If equal or similar pathways are found, e.g., within various databases, it is determined to indicate that the respective pathways have the same events in the same order, within predetermined thresholds, over certain periods of time.

Thus, two or more pathways that share the same sequence at the same place on their respective pathways, and therefore sharing the same point in an interconnected group, or network, of pathways of events happening in pursuit of a desired outcome or goal may be classified together as the same pathway.

Within a navigation code, keys representing the events in a single period form segments, and a series of segments represent all events in all time periods leading to the goal or outcome. A complete series of segments form the pathway. These pathways are generated for all records containing data of interest in the one of more databases, and may be saved for reference, e.g., within one or more of the databases. The navigation code structure resulting from the concatenation of segments and, ultimately, keys, facilitates the analysis and navigation of the records' respective pathways. To determine all the pathways of a database that share a certain set of events in a specific order, a copy of the desired segment is generated and can be used to search for common desired segments across a broad database. The common segment could occur in any portion of any navigation code and still be found, regardless of the length of the searched pathways.

Segment matching using navigation codes enables identification of complete pathways that are relevant to achieve a similar goal. For example, if a first pathway includes events described by the initial portion of the pathway, a completed pathway to a desired goal may be searched for with within a database, where the completed pathway includes the same initial portion of the pathway. By locating common segments within a database, completed pathways of others, e.g., other individuals, students, professional, and the like, who are similarly situated can be identified. This allows insight into what similarly situated individuals have done while achieving the desired goal. Additionally, this allows for the determination of other goals or outcomes similar pathways have led to, starting from a common point. With this information, an optimal pathway can be identified as a desirable course of action to reach the goal.

It should be noted that the navigation code scheme is not merely a unique identifier of records or events. Rather, it uniquely identifies a series of records containing the same events in the same order, within a predefined time period. Similar records, (i.e., records that share some identical events in the same order), also share common segments in their respective navigation codes.

The resulting navigation codes allow for the easy recognition and organization of common and similar records into a network of pathways, e.g., accessed from one or more databases. In this network, the data can be used to inform a user on how best to reach desired goals by the accumulated experiences of all previous similarly situated persons who have experienced the same events.

It should be further noted that while the navigation code discussed herein is implemented via a string that represents a pathway a person has taken to achieve a certain goal, the string is in no way meant to be limiting. The navigation code can be implemented via a number of computer processes and data types, and is not necessarily limited to this string-based implementation.

In an embodiment, events within a pathway may be external and distinct from the data usually included in pathways, such as season statistics in baseball or medication data in medicine, but capable of being included in pathways and thus represented in the resulting navigation code. Examples of such data include external experiences in education known to enhance the learning process, such as participation in a non-school sport; access to a known batting coach for a professional baseball player; transfer to a hospital known for a high percentage of successful outcomes for treatment of a disease, and the like.

In an example embodiment, if a period is defined as an academic year, everything that occurs less than one academic year prior to achievement of the goal is assigned period 1, everything occurring from one to two years prior is assigned period 2, and so on. If a goal is achieved at the end of high school senior year, for example, then everything in senior year would be period 1, everything in junior year would be period 2, and so on. For example, if a student participates in karate at an external facility freshman through junior year of high school, karate is documented as an external event. If that student is injured at the end of his or her junior year and cannot continue, karate would be assigned a unique key and appear in the navigation code for assigned periods 4-2. Karate would not appear in period 1, corresponding to senior year, because the student became injured and did not continue the sport.

It should be noted that periods are not limited to calendar periods. Period may include, not are not limited to, period of time relative to a goal, periods of time relative to academic progression, e.g., academic age, and period of time relative to a diagnosis or a goal setting.

In an embodiment, each event included in a pathway is assigned an unique key that is stored in a master table of events. These keys are then used in the generation of the navigation code. This is performed for every event associated with the defined goal.

These preliminary navigation code components are then sorted, with each group of components associated with one person's record, first by the number of periods before the goal was achieved, then by the order of the keys themselves.

In an example embodiment, academic age is used in the sorting in addition to, or in place of, time period relative to the achieved goal. The keys are then concatenated into a string. Groups of keys are partitioned into corresponding periods via a period delimiter. Within periods individual keys, representing individual events, are partitioned via a key delimiter. Empty periods will result in two or more consecutive delimiters.

At S170, an optimal pathway to a goal is determined. The optimal status of a pathway may be determined based on a variety of predetermined factors, including price of pathway, e.g., cost of courses within an educational context, time required to complete pathway, likelihood of success compared to other pathways for similar goals, and the like.

Referring now to FIG. 2, shows two example pathways generated according to an embodiment. In the example pathway, P denotes a period, such that events within a first period are placed between a pair of 'P's, events within a second period and placed between a second pair of 'P's and so on. The first pathway 210 uses the character delimiter "P" to denote a first period, followed by the key leading delimiter "<", then a six digit decimal "000661" to denote an event. The key trailing delimiter ">" follows, and the navigation code ends with ten "P"s, denoting ten periods where no events happened. The navigation code describes a pathway where a number of events were only recorded in the first period, followed by ten periods where no events were recorded.

The second pathway 220 contains all of the elements of the first navigation code example, along with an additional six digit decimal code, "000512," associated with a different event. The new code is positioned between the code, "000661," and the ten "P"s, and has its own leading and trailing key delimiters. This navigation code describes a pathway where two events were recorded within the first time period, followed by ten periods where no events were recorded. In this example, events are sorted in descending order within a period, but the invention encompasses the use ascending order as well.

As discussed above, the generated navigation codes are not unique identifiers for the records used to generate the navigation code. The same navigation code may be assigned to multiple records, so long as each record represents the same sequence of events within the specified periods. The generated navigation codes uniquely define common sequences of events, not the records themselves.

For example, student records that share common courses and period sequencing will share common navigation codes, enabling a count of common generated navigation codes, or code segments. The associated pathway of a group of students sharing common courses, non-course experiences and ordering can be considered to have been traversed by that group, with the number of traversals equal to the number of identical generated navigation codes or segments.

Thus, a group of t individual student pathway codes where r students share n common orderings of courses and non-course events will generate (t+n)−r pathways, each identified by a unique navigation code. For example, from 1,000 individual student pathway codes, 900 students have taken 10 common orderings of courses and non-course events. The total number of unique pathways would be (1000+10)−900 or 110 unique pathways, consisting of 100 pathways traversed by one student each, and 10 pathways traversed by a total of 900 students taking the 10 common orderings of courses and non-course events.

Referring now to FIG. 3, there is shown an example of two distinct pathways according to an embodiment. A first pathway 310 includes two segments within the first period, two additional segments within a second period, one segment within a third period, and eight periods where no events were recorded.

Pathway 320 matches pathway 310 for the first two periods, but differs in its third period in that no event is recorded, shown by two adjacent 'P' indicators. A segment exists in the fourth period, followed by seven periods of no events.

With the invention codes, called "navigation codes," one can conceive of the two pathways in the example sharing a common pathway segment through the second period. At the end of the second period, there's a branch, with two distinct sub-branches emerging from this common point. Each branch represents an effort to reach the goal state. By analyzing the success or failure of each branch, a relative correlation between combinations of events and reaching the goal state can be determined. Multiplying such an analysis by the thousands or millions of pathways derived from individual records, depending on the size of the accessed databases, and a robust understanding of the optimal ways to reach a goal can emerge.

In an embodiment, the navigation codes are generated for each record, where the records that generate a common navigation code are represented via a pathway with a traversal count, (i.e., the number of times a person used the pathway attempting to reach the goal state), equal to the number of individual pathway records. Common parts of pathways are represented by common sequences in their respective navigation codes. This supports a conceptual structure of pathways: individual pathways may join at common events, and branch off as the pursuit of the goal is attempted through different means.

As a non-limiting example, a user seeks advice on how to reach the goal state. Using the navigation code generated by the events the user has already experienced, the user can be placed in a network of pathways at a point corresponding to similarly-situated individuals, namely all those with a similar pathway up to that point. Based on the existing records, one or more successful pathway to achieve a desired goal is determined, based on comparisons of various successful pathways. The navigation codes enable not only the pathway structure and the current person's placement on it, but support an advisory mechanism where all previous experiences can be comprehensively analyzed and used to advise the current user. Metrics on overall performance can be gathered, as can data on individual event's effectiveness in helping people reach their goals.

As a further example, a baseball player may set a goal of playing in a major league. First, one or more databases containing records of baseball players are accessed, where the records include significant events or events for multiple individual players. The record of each individual player may include data documenting the final outcome of that player, e.g., performance statistics, scouting reports, and other data documenting their level of ability when they were called up to a major league team, or at their last team in the minor league system when they exited the game. Experience keys would be assigned to relevant data, and the keys organized into a segment which would occupy a period in the navigation code.

This process could then be repeated for each period. In this example, a period may be designated as signifying a single baseball season. In an embodiment, the analysis works backward from the goal toward a player's first season in the system. Experience keys are assigned to records data, with delimiters for each key, and the keys are sorted into a segment uniquely identifying the data describing that period or season. The concatenation of segments, bounded by period delimiters, comprise the navigation code.

It should be noted that event keys are definable. In this baseball example, an event can be defined per each player position, and per performance of that player. Events may be defined in various manners. For example, a performance 'event' may include an achievement of "top 25% offensively in league at position." Alternatively, each statistic may be assigned its own unique key (e.g., batting average, Wins Above Replacement (WAR) statistic, etc.). Each piece of data receives its own unique event key. In an embodiment, the records may include data that does not have assigned an event key, as it may be deemed unimportant, and is thus ignored. From all data available about a player, a subset is recognized with an event key and goes into the period segments and, ultimately, the navigation code. These data, reflected in the navigation code, constitute that player's pathway.

Player records are then used to generate navigation codes, and identical codes identify identical pathways, which can be combined into a common pathway. A count may be assigned to each of the identical pathways to reflect the number of players who have taken that same pathway. As navigation codes are generated for more players, a network of pathways, with common points compiled from common segments in respective pathways, are developed.

Continuing within the baseball player example, a current player can then be placed within this network of pathways. For example, a player who just completed the third year of their professional baseball career having a segment describing a just-completed season may be determined to have a pathway equivalent to that of 12 other players already in the network who have played at least three seasons. Thus, the player shares a common point in the pathways network with these other players, and can use their pathways after the shared pathway point to inform his next career move. As an example, it may be determined that among the twelve other players sharing this common pathway, five took a common pathway from that segment to their respective outcomes, with four successfully reaching the majors and one stopping at the highest minor league level, and further that the remaining seven players took seven other unique pathways, with only one reaching the majors and the other six stopping at different points in the minors.

Thus, for the current player, the preferred pathway may be the one with the highest percentage of similarly-situated players reaching the majors, if that is the desired goal. The same data may be used not only by an individual player, but by, e.g., a baseball organization. For the organization, they may determine that the teams of the players in the latter part of the relatively more successful pathways are more effective at developing these types of players along this pathway.

A further example relates to treatment pathways in medicine. Many individuals' medical records data, e.g., stored within a hospital database, for a particular disease can be used to create a network of pathways, containing each patient's treatment pathway and outcome.

As in the above discussed examples, keys and periods can be defined by a user. For some ailments, a period defined as a month may be optimal, which for others a period of a day may be more effective. Which data received a designation as an event, and representation in the segment, can also vary by ailment and treatment method. For heart disease, e.g., blood pressure and pulse rates can be captured. For infections, body temperature and blood tests results can be assigned event status. Data occurring within the defined periods are represented by events comprising the segment within that period's delimiters. As event fill segments, and segments take their place within their respective periods, the navigation code is constructed.

As more patient records and data enter the system, more navigation codes are generated and a pathways network is developed. Unique patients whose treatment, physical characteristics, and other data generates the same events, in the same order within the designated periods, will have identical navigation codes and thus the same pathway segment. Different pathways that share the same segments, in the same period, will share the same point along the pathway network.

For example, three patients with identical coronary blockages (as defined by the keys representing the data) may receive three different treatments. Patient A has stents surgically installed, Patient B has Coronary Artery Blockage Graft (CABG) surgery, while the Patient C takes medications only. Four periods later, their respective treatment and physical data generate identical segments, in the same period relative to their outcome states. Their respective navigation codes would all differ for four periods, with the fifth period being the identical segments. This would be a shared point in the pathways network. From this shared point, one can calculate path success rates for the pathways going forward. Current patients who reach this shared point can use the pathways and associated success rates moving forward for advice on how to proceed with their own care.

In an embodiment, the disclosed method includes enhanced pattern-matching software, e.g., with Regular Expressions performed by a language such as Java, Perl, or with SQL's LIKE, with capability to match either an entire pathway, or segments within pathways, with an arbitrarily large group of pathways, or segments within that group of pathways. This would enable a user interface allowing users to query a pathway network for data on similarly-situated past user, without having to fully list the events defining any point in that network. The user could enter logical search criteria similar to a browser search with "at least one of these" or "any of these" parameters. The software, using navigation codes described by this invention, could then translate the user directive into search patterns, and return potential courses of action in real-time by finding successful pathways meeting the user's search criteria.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

Figure 4:
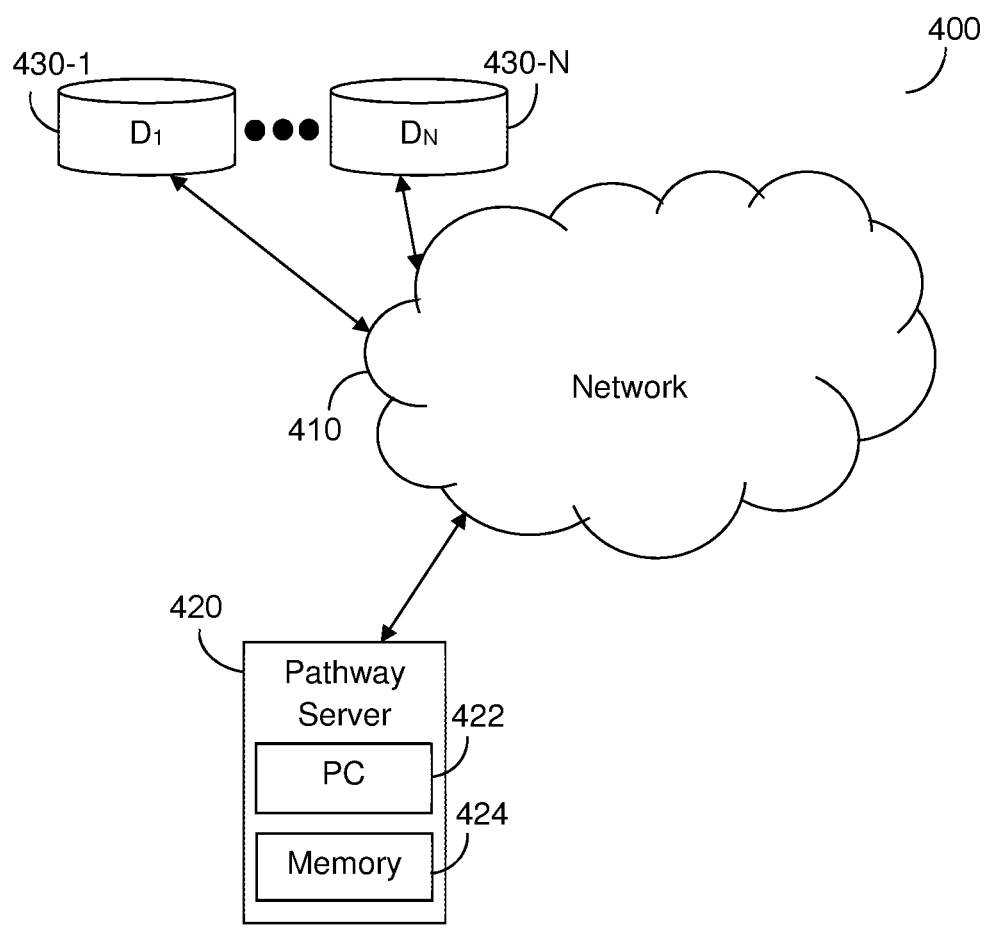
FIG. 4 is a network diagram utilized to describe the various disclosed embodiments.

FIG. 4 shows an example network diagram 400 illustrates a potential deployment of a pathway server 420 utilized to perform the various disclosed embodiments.

In the example network diagram 400, a pathway server 420 and a plurality of databases 430-1 through 430-N (where N is an integer equal to or greater than 1, hereinafter referred to individually as a database 430 and collectively as databases 430, merely for simplicity purposes) are communicatively connected via a network 410. The network 410 may be, but is not limited to, a wireless, cellular or wired network, a local area network (LAN), a wide area network (WAN), a metro area network (MAN), the Internet, and any combination thereof.

The pathway server 420 is configured to execute the process for analyzing data and determining optimal pathways toward a goal based on such data. In an embodiment, such a determination can be performed using a classifier (not shown) trained to classify various events, and relate such events along a pathway. The classifier can be trained using any application of a machine learning technique.

The classifier may be trained using previous event determinations from various databases and other data sources. An embodiment of the pathway server 420 includes a processor 422 and a memory 424 to execute the method described herein. An example block diagram of the pathway server 420 is provided below. It should be noted that the pathway server 420 may be installed on-premises or in a cloud computing platform.

The databases 430 may be, but are not limited to, data repositories or databases holding a variety of event data, such as completed class work, course catalogues, professional accomplishments, patient data, and the like. According to an embodiment, and as further described herein, the pathway server 420 is adapted to determine a pathway from various events, and determine which events within a plurality of events are determined to be equal for the purposes of the present disclosure. Furthermore, the pathway server 420 may be configured to determine an optimal pathway to attain a predetermined goal based on success rates of previous pathways, minimal cost, minimal time of completion to the predetermined goal, least likelihood of abandonment, wherein the goal is achieved at an institution located closest to a predetermined location among other institutions, wherein the goal is achieved at an institution where a user is currently enrolled, and the like.

Figure 5:
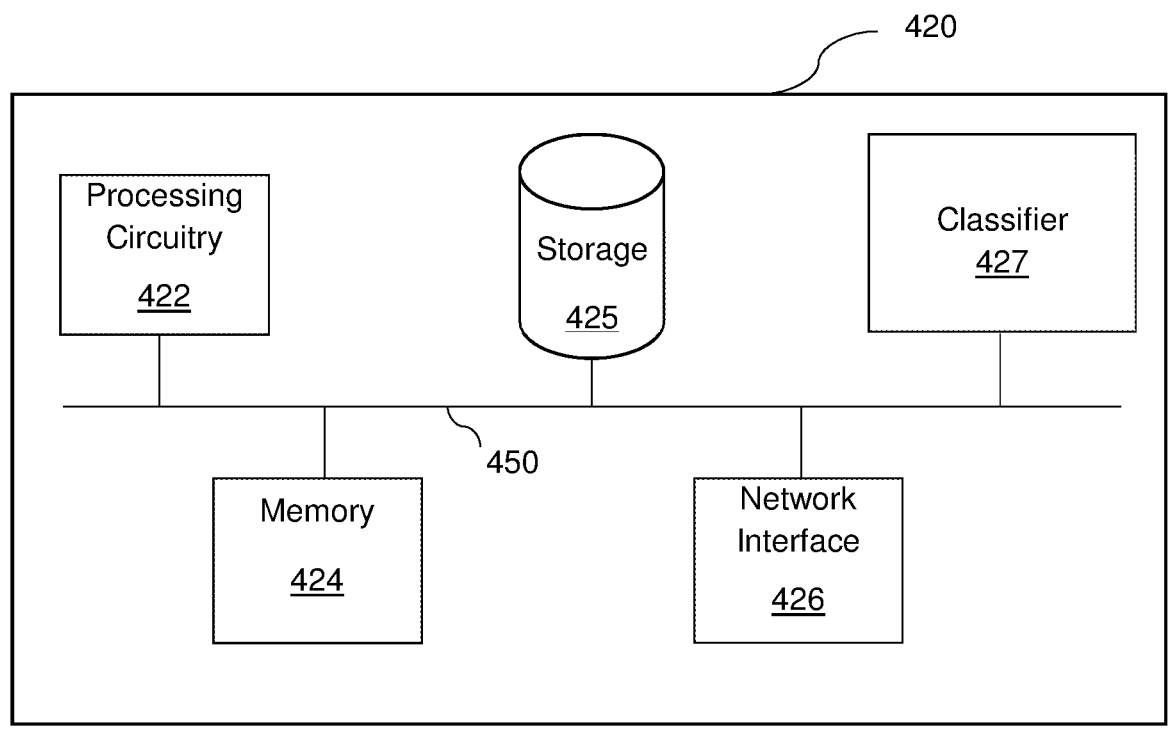
FIG. 5 is a schematic diagram of a pathway server according to an embodiment.

FIG. 5 is an example schematic diagram of the pathway server 420 according to an embodiment. The pathway server 420 includes a processing circuitry 422 coupled to a memory 424, a storage 425, and a network interface 426. In an embodiment, the pathway server 420 may include a classifier 427. In another embodiment, the components of the pathway server 420 may be communicatively connected via a bus 450.

The processing circuitry 422 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 424 may be volatile (e.g., RAM, etc.), non-volatile (e.g., ROM, flash memory, etc.), or a combination thereof. In one configuration, computer readable instructions to implement one or more embodiments disclosed herein may be stored in the storage 425.

In another embodiment, the memory 424 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 422 to perform the various processes described herein. Specifically, the instructions, when executed, cause the processing circuitry 422 to determine events, the equal status of multiple events, various pathways, and optimal pathways based on retrieved data.

The storage 425 may be magnetic storage, optical storage, and the like, and may be realized, for example, as flash memory or other memory technology, CD-ROM, magnetic hard drive, solid state hard drive, or any other medium which can be used to store the desired information.

The classifier 427 may include, but is not limited to, a feature and/or pattern recognition processor (RP) (not shown) configured to identify patterns, features, or both, in various data sets.

The network interface 426 allows the pathway server 420 to communicate with the network 410, the databases 430, or a combination thereof, of FIG. 1 for the purpose of, for example, collecting metadata, retrieving data, storing data, and the like.

It should be understood that the embodiments described herein are not limited to the specific architecture illustrated in FIG. 5, and other architectures may be equally used without departing from the scope of the disclosed embodiments.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method, implemented by a computer, for determining optimal pathways to a predetermined goal, comprising:

generating, by the computer, only one unique code for each event that has occurred within a plurality of data records electronically accessed by the computer based on an analysis of the data records by the computer, where the same unique code will be generated for similar events;

constructing, by the computer, at least one pathway using the unique codes based on the events, wherein the at least one pathway comprises at least one segment;

determining, by the computer, a goal, wherein the goal is contained in and is at the end of the at least one pathway;

comparing, by the computer, the at least one pathway to other pathways sharing the determined goal; and determining, by the computer, at least one optimal pathway for achievement of the determined goal.

2. The method of claim 1, wherein the comparing the at least one pathway includes comparing the at least one segment of the at least one pathway to all pathways sharing common segments.

3. The method of claim 1, wherein determining at least one optimal pathway includes determining a pathway for the achievement of the determined goal with at least one of: minimal cost, minimal time, highest likelihood of success of attaining the determined goal, wherein the goal is achieved, wherein the goal is achieved at an institution located closest to a predetermined location among other institutions, and wherein the goal is achieved at an institution where a user is currently enrolled.

4. The method of claim 1, further comprising:
pruning the at least one pathway, wherein the pruning comprises removing events determined to be insignificant to the achievement of the goal.

5. The method of claim 1, further comprising:
determining the fungibility of the event contained within the at least one pathway, wherein fungibility is the interchangeable characteristic of an event such that it may be swapped with another event without affecting the pathway.

6. The method of claim 1, further comprising:
determining, by the computer, the likelihood of success of achieving the determined goal based on previous pathways that achieved the determined goal from a location within various pathways from all pathway segments to the goal emanating from the location.

7. The method of claim 1, wherein the at least one pathway is represented by a string of alphanumeric characters, the pathway including a plurality of events, each of the events being represented by its respective unique code.

8. The method of claim 7, wherein the string is comprised of a concatenation of at least one set of period delimiters, at least one key delimiter, and at least one group of key builds, so as to specify the pathway.

9. The method of claim 8, wherein information between a set of period delimiters represent events that occurred within a prescribed time period.

10. The method of claim 1, wherein the at least one pathway is a collection of events that lead from a starting point to a defined goal.

11. The method of claim 1, wherein the at least one pathway is divided into at least one segment containing at least one event.

12. A non-transitory computer readable medium having stored thereon instructions for causing a processing circuitry to perform a process, the process comprising:
generating, by the computer, only one unique code for each event that has occurred within a plurality of data records electronically accessed by the computer based on an analysis of the data records by the computer, where the same unique code will be generated for similar events;

constructing, by the computer, at least one pathway using the unique codes based on the events, wherein the at least one pathway comprises at least one segment;

determining, by the computer, a goal, wherein the goal is contained in and is at the end of the at least one pathway;

comparing the at least one pathway to other pathways sharing the determined goal; and determining at least one optimal pathway for achievement of the determined goal.

13. A system for determining optimal pathways to a predetermined goal, comprising:
a processing circuitry; and
a memory, the memory containing instructions that, when executed by the processing circuitry, configure the system to:
generate only one unique code for each event that has occurred within a plurality of data records electronically accessed by the computer based on an analysis of the data records by the computer, where the same unique code will be generated for similar events;
construct at least one pathway using the unique codes based on the events, wherein the at least one pathway comprises at least one segment;
determine a goal, wherein the goal is contained in and is at the end of the at least one pathway;
compare the at least one pathway to other pathways sharing the determined goal; and
determine at least one optimal pathway for achievement of the determined goal.

14. The system of claim 13, wherein comparing the at least one pathway includes comparing the at least one segment of the at least one pathway to all pathways sharing common segments.

15. The system of claim 13, wherein determining at least one optimal pathway includes determining a pathway for the achievement of the determined goal with at least one of: minimal cost, minimal time, highest likelihood of success of attaining the determined goal, wherein the goal is achieved, wherein the goal is achieved at an institution located closest to a predetermined location among other institutions, and wherein the goal is achieved at an institution where a user is currently enrolled.

16. The system of claim 13, wherein the system is further configured to:
prune the at least one pathway, wherein the pruning comprises removing events determined to be insignificant to the achievement of the goal.

17. The system of claim 13, wherein the system is further configured to:
determine the fungibility of the event contained within the at least one pathway, wherein fungibility is the interchangeable characteristic of an event such that it may be swapped with another event without affecting the pathway.

18. The system of claim 13, wherein the system is further configured to:
determine the likelihood of success of achieving the determined goal based on previous pathways that achieved the determined goal from a location within various pathways from all pathway segments to the goal emanating from the location.

19. The method of claim 13, wherein the at least one pathway is represented by a string of alphanumeric characters, the pathway including a plurality of events, each of the events being represented by its respective unique code.

20. The method of claim 19, wherein the string is comprised of a concatenation of at least one set of period delimiters, at least one key delimiter, and at least one group of key builds, so as to specify the pathway.

\* \* \* \* \*